Dec. 7, 1965    A. M. BERNSTEIN    3,221,631
PHOTOCOPY DEVICE
Original Filed Dec. 18, 1961    3 Sheets-Sheet 1
FIG. 1
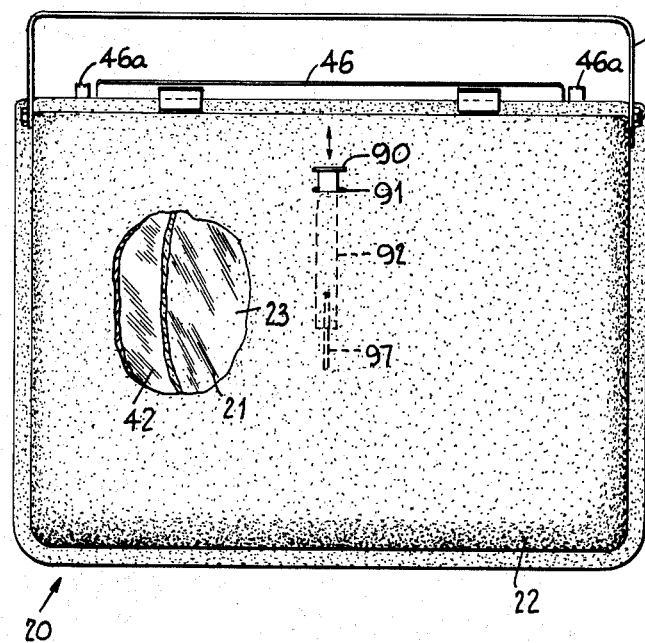
FIG. 2
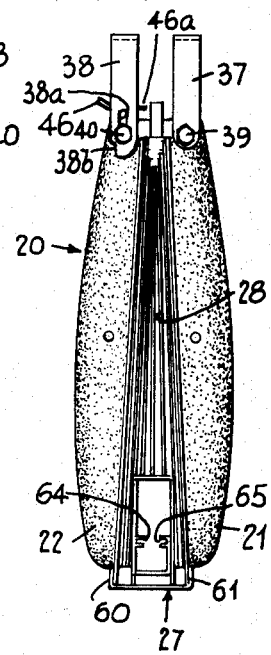
FIG. 4
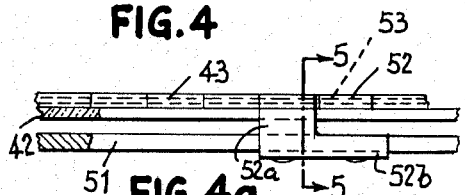
FIG. 4a
FIG. 5
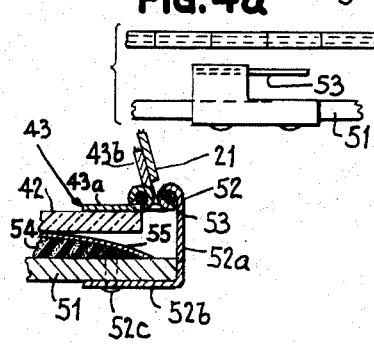
FIG. 3
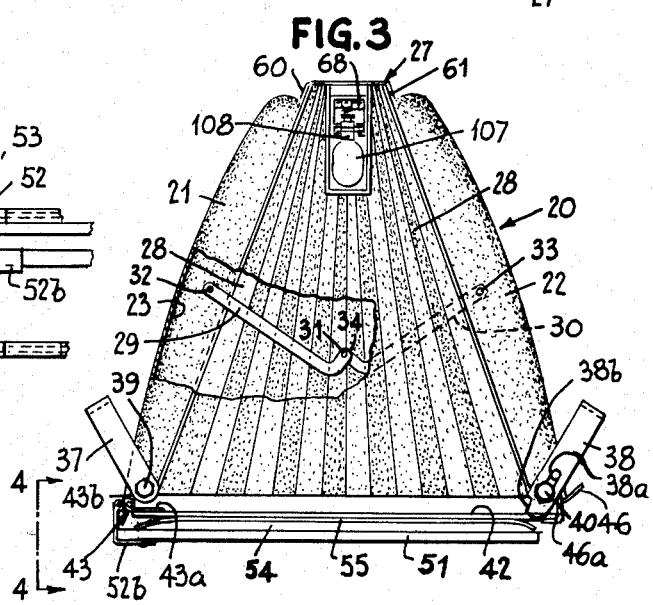
INVENTOR.
ALFRED M. BERNSTEIN
BY Percy Freeman
ATTORNEY.

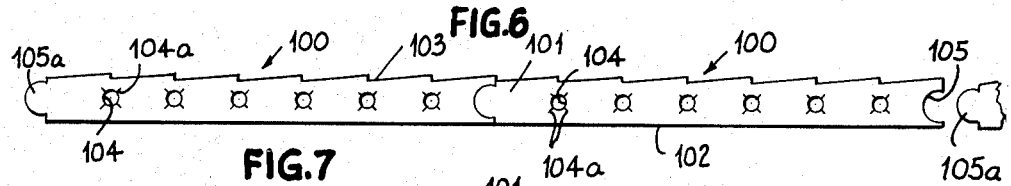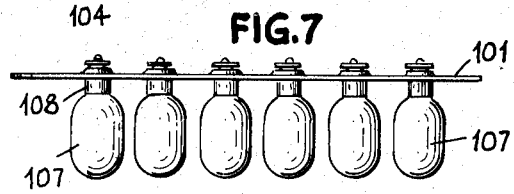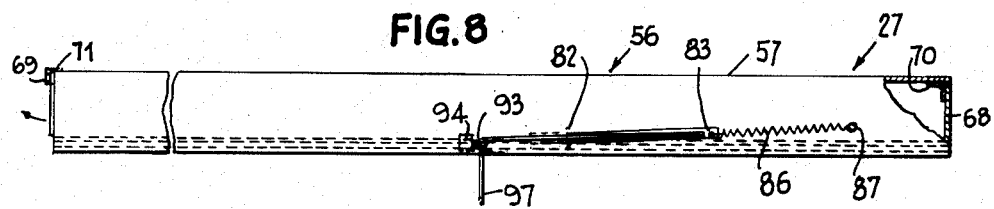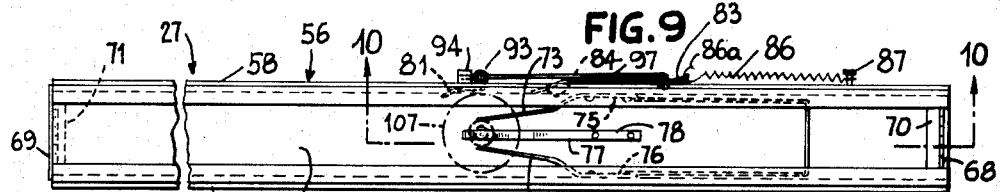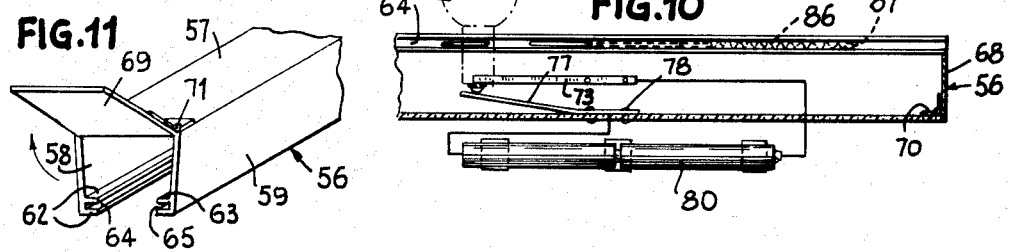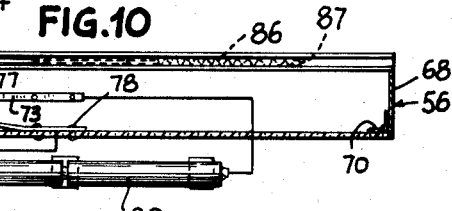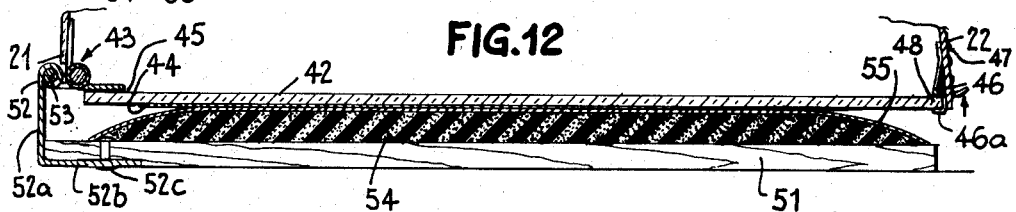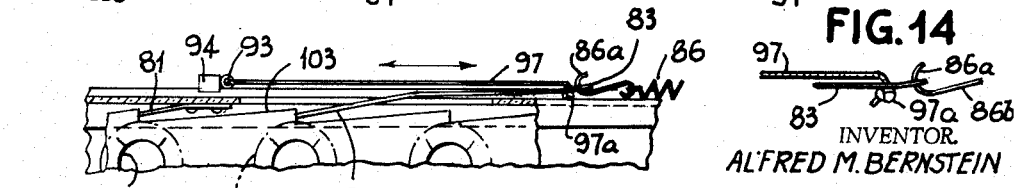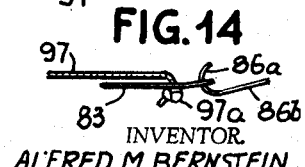

Dec. 7, 1965 A. M. BERNSTEIN 3,221,631
PHOTOCOPY DEVICE
Original Filed Dec. 18, 1961 3 Sheets-Sheet 3
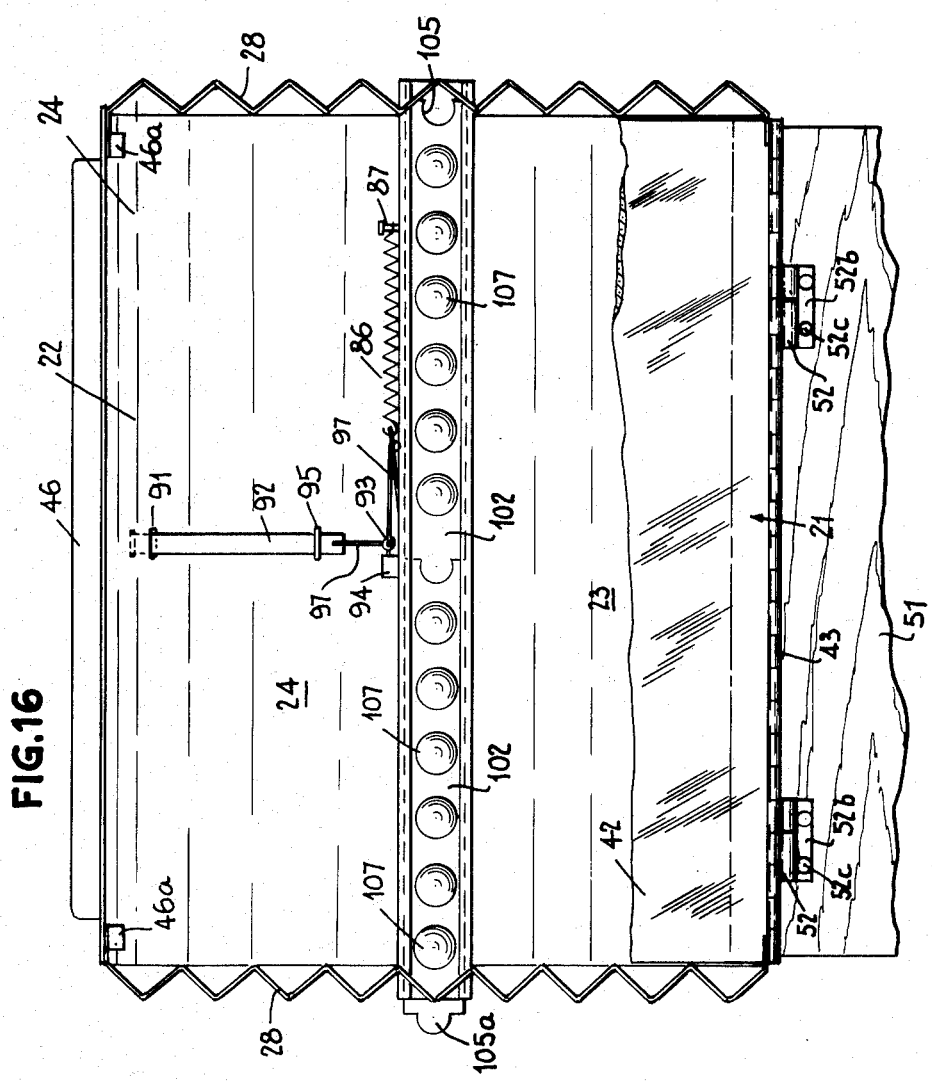
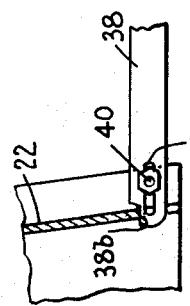
INVENTOR.
ALFRED M. BERNSTEIN
BY
ATTORNEY.

United States Patent Office 3,221,631
Patented Dec. 7, 1965

3,221,631
PHOTOCOPY DEVICE
Alfred M. Bernstein, Lynbrook, N.Y., assignor to Grafex Corporation, New York, N.Y., a corporation of New York
Continuation of application Ser. No. 160,055, Dec. 18, 1961. This application July 20, 1964, Ser. No. 385,546
14 Claims. (Cl. 95—73)

This invention relates generally to photocopying apparatus for reproducing printed material.

This application is a continuation of copending application Serial No. 160,055, filed December 18, 1961, and entitled Photocopy Device.

It is one object of the present invention to provide a device of the type described which is adapted for quicker and easier copying operation, and which is readily portable for use at any desired location.

It is another object of the present invention to provide a photocopying device of the type described, wherein exposure of the copy materials may be more rapidly, uniformly and accurately achieved under any environmental conditions.

The instant invention further contemplates the provision of unique flash-bulb handling and energizing structure, which is highly automatic to require only a single operation for each exposure to energize a flash bulb, remove the used bulb and feed or index a new bulb into position to be energized, all with only a single manual action.

It is still another object of the present invention to provide a photocopying apparatus of the type described adapted for use with conventional photocopy supplies, and wherein unique structural means assures firm and complete facing contact between the sensitized paper and material being copied.

It is still a further object of the present invention to provide photocopying apparatus having the advantageous characteristics mentioned in the preceding paragraphs which is extremely simple in structure, durable and reliable throughout a long useful life, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIG. 1 is a side elevational view showing the copier of the instant invention in a closed condition, and partly broken away to illustrate interior construction.

FIG. 2 is an end view showing the copier of FIG. 1 in closed condition.

FIG. 3 is an end view showing the copier in open or operative condition, and partially broken away to illustrate interior construction.

FIG. 4 is a fragmentary side view taken substantially along the line 4—4 of FIG. 3.

FIG. 4a is a view similar to FIG. 4, but showing elements thereof disengaged.

FIG. 5 is a sectional view taken substantially along the line 5—5 of FIG. 4.

FIG. 6 is a plan view showing flash-bulb carriage means constructed in accordance with the teachings of the present invention.

FIG. 7 is an elevational view showing the lamp-carriage means of FIG. 6, and illustrating a series of lamps carried thereby.

FIG. 8 is an elevational view showing the side-wall connection means of the instant apparatus apart therefrom, and broken away to conserve drawing space.

FIG. 9 is a bottom plan view of the connection means of FIG. 8.

FIG. 10 is a partial sectional view taken substantially along line 10—10 of FIG. 9.

FIG. 11 is a fragmentary end perspective view showing the connection means of FIGS. 8–10.

FIG. 12 is an enlarged fragmentary view further showing the structure of FIG. 5.

FIG. 13 is an enlarged fragmentary view showing elements shown in FIG. 9, but in greater detail.

FIG. 14 is an enlarged fragmentary view showing in greater detail certain elements shown in FIG. 13.

FIG. 15 is an enlarged fragmentary view showing certain elements illustrated in FIG. 3, but in greater operative detail.

FIG. 16 is a bottom view of the instant photocopier in its full open or operative condition, but with parts broken away for clarity of understanding.

Referring now more particularly to the drawings, and specifically to FIGS. 1–3 thereof, a copier of the present invention is there generally designated 20, and includes a pair of facing spaced side walls 21 and 22. The side walls 21 and 22 preferably have their inner surfaces reflectively coated, as at 23 and 24, respectively, and may be of arcuate or outwardly bowed configuration, all for enhanced concentration of illumination, as will appear presently.

The upper longitudinal edges of the side walls 21 and 22 are connected together by connection means, generally designated 27, which hingedly connects the side walls for swinging movement between their closed, generally parallel positions of FIGS. 1 and 2, and their open downwardly diverging position of FIG. 3.

Extending between each adjacent pair of end edges of the side walls 21 and 22 is a pleated, or otherwise collapsible end wall 28. Thus, the end walls 28 are expansile and contractile for respective opening and closing of the side walls.

A linkage, say of links 29 and 30 may be connected between the side walls 21 and 22 at each end thereof. The links 29 and 30 may have their inner ends connected together, as by pivot 31, and have their outer ends respectively connected by pivots 32 and 33 to side walls 21 and 22. Thus, the linkage 29, 30 swings from a closed, generally parallel position to its open position of FIG. 3 upon opening movement of the side walls 21 and 22; and, a stop lug or abutment 34 may be carried by one of the links 30 for engagement with the other link 29 to limit opening movement of the links, and consequently to limit opening movement of the side walls.

For convenient portability, the instant copier 20 may be provided with suitable carrying means, such as embodied in the generally U-shaped members or bails 37 and 38, respectively connected to the side walls 21 and 22 at the lower edges thereof. That is, the bail 37 is pivotally connected, as by pins 39 to the lower edge region of the side wall 21, while the bail 38 is pivotally connected by pins 40 to the lower region of the side wall 22. In the closed positions of FIGS. 1 and 2, the bails 37 and 38 have been swung toward each other for convenient manual grasping, while in the open position of FIG. 3, the bails have been swung outward so as to extend above the lower edges of the side walls. As best seen in FIG. 15, the bail 38 has its legs each provided with a slot 38a slidably and rotatably receiving the pins 40. Further, the distal end of each leg of bail 38 is notched, as at 38b for abutting engagement with the lower edge of wall 22. That is, when the bail 38 is slid inwardly toward the wall 22, by the slots 38a slidably receiving the pins 40, the abutment notch 38b is engageable with the lower edge of wall 22. In this condition, downward force may be exerted on the bail 38 to insure complete facing contact of the photocopy supplies, as will appear more fully hereinafter. For free swinging of the bail 38, the latter may be slid outwardly away from the wall 22, so that the notch 38b will clear the wall.

A transparent panel or pressure plate 42, say of plastic or glass, has one edge extending along and hingedly connected to the lower edge of one side wall, say the side wall 21, as by a hinge 43. The plate 42 is thereby swingable between its closed position, see FIG. 1, in substantial parallelism with and between the side walls 21 and 22, and its open position of FIGS. 3, 5 and 15 extending generally horizontally between the lower, spaced-apart edges of the side walls.

Adjacent the lower edge of side wall 22 there may be provided (FIG. 12) one or more resilient detents 46 of suitable construction for releasable holding engagement with the plate 42. The detent 46 may, as illustrated, include a resilient strip or leaf anchored by fasteners 47 to the side wall 22 adjacent the lower edge thereof, and combined with a lip or ledge fixed to the wall 22 to define an inwardly facing notch or goove 48 for releasably receiving the edge of plate 42. That is, the edge of plate 42 is swingable about the axis of hinge 43 to snap engage past the spring detent 46, and there be held between the latter and ledge 46a. However, upon manual depression of the detent 46, the latter is swung outward to release the plate 42 for upward or inward swinging movement.

In addition, a support panel 51 for copy material may also be hinged to the lower edge of side wall 21 for swinging movement into and out of underlying relation with the plate 42 when the latter is in its generally horizontal, open position. The support panel 51 may have one edge hingedly connected to the side wall 21, also by the hinge means 43. The hinge means 43 may include certain curled ears or knuckles 52 spaced from the hinge axis; and, a pintle or pin 53 may be secured to the panel 51 and removably engageable in the knuckles 52 to define a detachable hinged connection. That is, an angle member 52b may be secured to the underface of panel 51, as by fasteners 52c, and have an upstanding arm 52a projecting normal to and above the panel for carrying the pintle 53. By this construction, the panel 51 may be conveniently detached from the hinge 43, as when its use is not required, say in copying from a bound book. Also, the panel 51, by the offset of arm 52a, may be swung to a closed or collapsed position substantially parallel to the plate 42 between the walls 21 and 22.

If desired, a conventional detachable hinge may be employed, such as is used in portable-typewriter cases. In the closed condition, the support panel 51 may swing with the pressure plate 42 into substantial parallelism between the side walls 21 and 22.

On the upper surface of support panel 51, there is advantageously provided a resilient body or cushion 54, preferably having a convexly arcuate upper surface. Thus, flexible copy material 44 may be interposed between the cushion-support panel 51 and plate 42, and firmly held therebetween in the desired flat condition. To insure perfectly flat, complete surface contact of the copy materials, the bail 38, in the condition shown in FIG. 15, may be manually urged downward, which effects spreading of the cushion 54 against the copy material to hold the latter firmly against the plate 42.

The connection means 27, best seen in FIGS. 8–11, may be of elongate, channel-like configuration 56, substantially coextensive with the side walls 21 and 22, including a back or top wall 57 extending laterally between the upper side edges of the side walls, and sides 58 and 59 depending in spaced relation into the space between the side walls. Suitable hinge means 60 and 61 respectively, connect the side walls 21 and 22 to the sides 58 and 59 of the channel 56.

The lower or inner edges of the sides 58 and 59 may be provided with longitudinal, inwardly extending ribs or rails, as at 62 on the channel side 58, and at 63 on the channel side 59. The vertically spaced ribs or rails 62 define therebetween a laterally inwardly opening, longitudinally extending groove 64; and, the vertically spaced ribs or rails 63 define in the space therebetween a laterally inwardly opening longitudinally extending groove 65, with the grooves 64 and 65 toward each other.

The channel 56, with its facing grooves, may be considered as defining a track extending longitudinally along the upper edges of the side walls 21 and 22.

The channel or track 56 is seen in more detail in FIGS. 8–11, and is there shown as having doors 68 and 69 on its opposite ends. The doors 68 and 69 are preferably resiliently urged toward a position closing their respective ends, and may be mounted by suitable spring-hinge means 70 and 71 for yieldable opening. More particularly, the spring-hinged door 69 is yieldably openable outward.

At one location longitudinally along the track or channel 56 preferably intermediate the ends thereof, there are provided a pair of yieldable, resilient strips or contacts 73 and 74, respectively anchored to channel sides 58 and 59, as by fasteners 75 and 76, and extending obliquely inward from the channel sides in the direction toward the outlet door 69. This is best seen in FIG. 9. An additional resiliently yieldable strip or contact 77 is anchored, as by fasteners 78, to the top or back 57 of the connection means channel 56, and extends obliquely inward or downward therefrom in the direction toward the outlet door 69, proximate to the contacts 73 and 74. As best seen in FIG. 10, a suitable source of electrical supply, such as batteries 80, is electrically connected on one side to the contact 77, and electrically connected on the other side to both the contacts 73 and 74.

In addition, exteriorly on one channel side 58, and extending inward through a slot 82 in the channel side, is an operating element or pawl 83. More specifically, the pawl 83 is generally exterior of the channel side 58 and has one end 84 bent obliquely inward through slot 82 to enter into the groove 64. The other end 85 of the operating member 83 is exterior of the side 58 and connected at 86a by a tension spring 86 to a lug 87 fixed to the channel side. Thus, the operating member 83 is resiliently urged rightward, as seen in FIGS. 8–10, and is movable leftward against the force of spring 86.

An elongate actuating member 92 is slidably mounted on the side wall 24 extending exteriorly thereof through a wall slot 91 and terminating in a finger piece 90. The actuating member 92 has its inner end connected by an elongate flexible element 97 to the operating member 83, proximate the spring hook 86a. More particularly, the elongate flexible member 97 passes slidably through an eye 93 fixed in alignment with the actuating member 92 and carried by a lug 94 on the channel 56.

Thus, the actuating member 92 is longitudinally reciprocable, and spring urged inward through the slot 91 by the spring 86, the finger piece 90 limiting inward movement of the actuating member. Longitudinal movement of the actuating member 92 against the force of spring 86 is limited by the stop member or guide 95.

As best seen in FIG. 13, a resilient retaining member or leaf spring 81 is fixed to the channel wall 58 in the groove 64, and extends obliquely therein, for a purpose appearing presently.

In FIG. 6 are shown a plurality of lamp carriages, generally designated 100. Each lamp carriage comprises a generally flat, elongate member of strip 101, which may have one side edge generally flat, as at 102. The other side edge is advantageously formed with a plurality of longitudinally spaced ratchet teeth 103 along substantially the entire length of the elongate member. Spaced laterally between the side edges of the elongate member, there are formed a plurality of holding portions, each of which may be defined by a through opening and one or more radial slits 105 extending from the opening. The holding portions or open formations 104, 105 are located in spaced relation longitudinally along the elongate member 101, in predetermined correspondence with the ratchet teeth 103.

In addition, opposite ends of each elongate member 101 are provided with interengageable formations for detachable connection to like elements arranged in end-to-end relation. More particularly, each lamp-carriage member 101 has one end provided with an arcuate cutout or concavity 105 of slightly greater than 180 degrees; and, the other end of each carriage member is formed with a generally circular or bulbous projection 106 having a convexly arcuate edge of slightly more than 180 degrees. Thus, the cutout 105 is adapted to removably receive and retain an end projection 106 adapted for removable retention in the cutout 105 of another carriage member.

As seen in FIG. 7, the holding formations or openings 104 are adapted to snugly and removably receive lamps or flash bulbs 107. In particular, the neck or base 108 of each flash bulb 107 is removably engaged through a respective opening 104.

In operation, the carrying means or bails 37 and 38 of the copier 20 are swung outward about their pivots 39 and 40, and the side walls 21 and 22 are swung from their closed position of FIGS. 1–2 to their open, downwardly divergent position of FIG. 3. This automatically expands the previously collapsed end walls 28, and opens the linkages 29, 30 to their limit, as illustrated in FIG. 3. The transparent plate 42 is swung downward from its collapsed position until its swinging edge snaps into the releasably held engagement with detent 46 and ledge 46a, shown in FIG. 12.

When it is desired to copy material from a relatively bulky source, such as a bound book, the plate 42 may then be pressed directly against the copy material, without use of the support panel 51. However, in copying loose sheets or the like, the copy material may be placed between the plate 42 and support panel 51, and the latter moved upward relative to the plate for holding the copy maerial flat against the plate. As noted, downward pressure on bail 38 in the condition of FIG. 15 assures facing contact.

Of course, it is understood that any desired photosensitive paper may be employed. In utilizing a conventional photosensitive paper to obtain a negative image, the paper is placed emulsion side down onto an upwardly facing sheet to be reproduced, and illumination thereby passes through the photosensitive paper. Also, other conventional methods of employing photosensitve materials may be utilized.

A lamp carriage 100 carrying a plurality of lamps 107, is inserted into the channel 56 through one end thereof, as by opening of the inlet door 58. Specifically, the lamp carriage is inserted in the channel with longitudinal side edges 102 and 103 respectively slidably engaged in grooves 64 and 65, the lamp bases extending into the channel, and the lamp envelopes depending from the channel.

The elongate member 101 is inserted into the channel 56 sufficiently to engage the pawl end 84 with a ratchet tooth 103. Then, upon downward movement of the actuating member 92, the operating member 83 is shifted leftward, bringing a lamp 107 into the illustrated position engaging the contacts 73, 74 and 77. This closes an electrical circuit through the lamp and energizes the latter to effect exposure of the copy material.

The exposure procedure may be repeated by the mere finger motion of the piece 90 to move the actuating member downward, and release thereof. This simple operation effects removal of a used bulb from engagement with the contacts, movement of an unused bulb into engagement with the contacts for energization thereof, and indexing of an additional bulb into position for sequential energization upon the next-repeated operation. The retaining member or pawl 81 engages a tooth 103 to prevent retraction upon return of the actuating member.

This above-described operation may be indefinitely continued by end-to-end interengagement of carriage members 101, as shown in FIG. 6, whereupon carriage members carrying used bulbs will be propelled stepwise outward through the left-hand end of the channel 56, as seen in FIGS. 8 and 9. That is, the carriage members 101 will pass outward through the outlet door 69, whereupon they may be removed and discarded.

From the foregoing it is seen that the present invention provides a copying apparatus which fully accomplishes its intended objects, and is well-adapted to meet practical conditions of manufacture and use.

What is claimed is:

1. In a copying device, an exposure chamber comprising a pair of reflective facing side walls, connection means connecting said side walls together along one pair of adjacent side edges for swinging opening-and-closing movement of said side walls between a generally parallel closed position and an open position diverging from said connection means, expansile and contractile end walls extending between adjacent end edges of said side walls for expansion and contraction upon opening-and-closing movement of said side walls, illuminating means carried by said connection means, a transparent plate extending in open position between the other pair of adjacent side edges of said side walls and connected to one of said side walls for swinging movement to a closed position in parallelism between said side walls, whereby said plate is adapted to rest flat on copy material for concentrated illumination of the latter through said plate, hinge means connecting said plate to said one side wall for said swinging movement, and releasable detent means on said other side wall engageable with said plate to releasably hold the latter in said open position, a support panel detachably connected to said hinge means for swinging movement into and out of underlying relation with said plate when the later is in open position, and a yieldable facing on said support panel engageable with the underside of said plate for holding copy material flat against said plate.

2. In a copying device, an exposure chamber comprising a pair of reflective facing side walls, connection means connecting said side walls together along one pair of adjacent side edges for swinging opening-and-closing movement of said side walls between a generally parallel closed position and an open position diverging from said connection means, expansile and contractile end walls extending between adjacent end edges of said side walls for expansion and contraction upon opening-and-closing movement of said side walls, illuminating means carried by said connection means, a transparent plate extending in open position between the other pair of adjacent side edges of said side walls and connected to one of said side walls for swinging movement to a closed position in parallelism between said side walls, whereby said plate is adapted to rest flat on copy material for concentrated illumination of the latter through said plate, said illuminating means comprising a track extending longitudinally along said connection means, electrical contacts at one location along said track and adapted for connection to a source of electrical supply, lamp-carriage means movable along said track past said contacts and having holding portions for carrying a series of lamps into successive engagement with said contacts, and operating means mounted on said connection means and engageable with said lamp-carriage means to move the latter stepwise for successively energizing lamps.

3. A copying device according to claim 2, said carriage means including ratchet formations for engagement with said operating means to effect said stepwise movement.

4. In a copying device according to claim 3, said operating means comprising an oscillatory member engageable with said ratchet formations in one direction of its oscillatory movement to effect each step of said carriage movement, and resilient means urging said oscillatory member in its other direction to return said member after each step motion of said carriage means.

5. In a copying device, a plurality of walls cooperating together to define an exposure chamber, one of said walls being a transparent plate toward which light is adapted to be directed in said chamber for making an exposure, and means located at that side of said transparent plate which is directed away from the interior of said chamber for holding against said plate the light-sensitive copy material which is to be exposed.

6. In a copying device as recited in claim 5, said means for holding said light-sensitive material against said transparent plate including a support panel and a yieldable facing on said support panel engageable with a surface of said plate which is directed away from the interior of said chamber.

7. In a copying device as recited in claim 6, said plate being adapted to form a bottom wall of said chamber during use of the copying device so that said panel and yieldable facing are situated beneath said transparent plate.

8. In a copying device, an exposure chamber comprising a pair of walls at least one of which has a reflective surface directed toward the other of said walls, connection means connecting at least said one wall to the other of said walls for movement from a closed position adjacent said other wall to an open position relatively distant therefrom, and said chamber including expansile and contractile walls extending between edges of said pair of walls for maintaining the interior of said chamber light tight, means operatively connected to said walls for releasably holding said one wall in its open position with respect to said other wall, and said exposure chamber in the open position of said one wall including at least a transparent wall formed by a transparent plate which in part defines the interior of said chamber and against which copy material is adapted to be situated for exposure to light within said exposure chamber.

9. In a copying device as recited in claim 8, means cooperating with said transparent plate for pressing against the latter a light-sensitive copy material which is to be exposed.

10. In a copying device as recited in claim 8, at least one of said walls carrying a handle facilitating the portability of the copying device when said one wall is in said closed position thereof.

11. In a copying device which includes a collapsible exposure chamber adapted to be expanded to an open position during use and to be collapsed during non-use, so that in the collapsed condition of said chamber the device can be easily carried about, and said copying device including means for providing in the interior of the chamber, at least in its expanded condition, light for exposing light-sensitive material, a transparent plate adapted to define at least part of said chamber in the expanded condition thereof and yieldable means situated next to a surface of said transparent plate which is directed away from the interior of said chamber in the expanded condition thereof for yieldably holding against said transparent plate light-sensitive material which is to be exposed.

12. In a copying device as recited in claim 11, said yieldable means including a body of foam plastic substantially coextensive with said plate.

13. In a copying device as recited in claim 12, a panel carrying said body of foam plastic with the latter situated between said panel and transparent plate.

14. In a copying device having a collapsible exposure chamber which is adapted to be expanded during use of the copying device and to be collapsed to render the copying device easily portable, the copying device also including a source light for exposing light-sensitive material, said exposure chamber including at least in its expanded condition a transparent wall against which light-sensitive material is adapted to be placed for exposure to light in said chamber, and means detachably connected to said transparent wall for holding against the latter light-sensitive material which is to be exposed, said means when detached from said transparent wall permitting the latter to be placed on an object which is to be copied but which is too bulky to be held against said transparent wall by said means.

No references cited.

EVON C. BLUNK, *Primary Examiner.*